United States Patent
Williams et al.

(10) Patent No.: US 8,005,956 B2
(45) Date of Patent: Aug. 23, 2011

(54) SYSTEM FOR ALLOCATING RESOURCES IN A DISTRIBUTED COMPUTING SYSTEM

(75) Inventors: Michael L. Williams, Rockwall, TX (US); Michael L. Forsman, Sachse, TX (US); James J. Mays, McKinney, TX (US)

(73) Assignee: Raytheon Company, Waltham, MA (US)

( * ) Notice: Subject to any disclaimer, the term of this patent is extended or adjusted under 35 U.S.C. 154(b) by 339 days.

(21) Appl. No.: 12/018,021

(22) Filed: Jan. 22, 2008

(65) Prior Publication Data

US 2009/0187658 A1 Jul. 23, 2009

(51) Int. Cl.
*G06F 15/173* (2006.01)

(52) U.S. Cl. ........ 709/226; 709/223; 709/224; 718/102; 718/104

(58) Field of Classification Search .......... 709/223, 709/224, 225, 226, 229, 203; 718/102, 104; 370/252
See application file for complete search history.

(56) References Cited

U.S. PATENT DOCUMENTS

| | | | | |
|---|---|---|---|---|
| 5,452,459 A * | 9/1995 | Drury et al. | ..... | 718/102 |
| 7,054,943 B1 * | 5/2006 | Goldszmidt et al. | ..... | 709/229 |
| 7,171,470 B2 * | 1/2007 | Doyle et al. | ..... | 709/225 |
| 7,299,229 B2 | 11/2007 | Doyle et al. | ..... | 707/8 |
| 7,310,684 B2 | 12/2007 | Patrick et al. | ..... | 709/238 |
| 7,451,183 B2 * | 11/2008 | Romero et al. | ..... | 709/224 |
| 7,493,382 B2 * | 2/2009 | Kudo et al. | ..... | 709/223 |
| 7,502,857 B2 * | 3/2009 | Barillaud et al. | ..... | 709/226 |
| 7,536,461 B2 * | 5/2009 | Stecher et al. | ..... | 709/226 |
| 7,581,008 B2 * | 8/2009 | Zhang et al. | ..... | 709/226 |
| 7,640,547 B2 * | 12/2009 | Neiman et al. | ..... | 718/104 |
| 7,644,153 B2 * | 1/2010 | Talwar et al. | ..... | 709/224 |
| 7,660,887 B2 * | 2/2010 | Reedy et al. | ..... | 709/226 |
| 7,765,552 B2 * | 7/2010 | Miller et al. | ..... | 709/226 |
| 7,774,457 B1 * | 8/2010 | Talwar et al. | ..... | 718/104 |
| 7,861,247 B1 * | 12/2010 | Santos et al. | ..... | 718/104 |
| 2002/0075810 A1 * | 6/2002 | Barillaud et al. | ..... | 370/252 |
| 2003/0005028 A1 * | 1/2003 | Dritschler et al. | ..... | 709/104 |
| 2005/0131982 A1 * | 6/2005 | Yamasaki et al. | ..... | 709/200 |
| 2007/0083588 A1 * | 4/2007 | Keller et al. | ..... | 709/202 |
| 2007/0240161 A1 * | 10/2007 | Prabhakar et al. | ..... | 718/104 |
| 2008/0240150 A1 * | 10/2008 | Dias et al. | ..... | 370/252 |

* cited by examiner

*Primary Examiner* — Ramy M Osman
(74) *Attorney, Agent, or Firm* — Baker Botts L.L.P.

(57) ABSTRACT

According to one embodiment, a distributed computing system includes a resource control system coupled to a web server. The web server configured in a service oriented architecture and operable to provide a business application by executing a plurality of services on a plurality of computers configured in the distributed computing system. The resource control system is operable to determine a performance parameter of the business application, and provision or unprovision one of the plurality of computers according to the determined performance parameter.

24 Claims, 4 Drawing Sheets

SYSTEM FOR ALLOCATING RESOURCES IN A DISTRIBUTED COMPUTING SYSTEM

TECHNICAL FIELD OF THE DISCLOSURE

This disclosure generally relates to distributed computing systems, and more particularly, to a resource control system for a distributed computing system.

BACKGROUND OF THE DISCLOSURE

Distributed computing describes an architecture in which applications may be executed on multiple computers. Distributed computing systems may provide relatively efficient use of computing resources by distributing processing load of multiple users. A computing grid is a particular type of distributed computing system that uses a number of computers coupled together through a network, such as the Internet. Computing grids often use low-cost, scalable hardware components that operate together in a synergistic fashion to provide computational power similar to other more expensive computing systems.

SUMMARY OF THE DISCLOSURE

According to one embodiment, a distributed computing system includes a resource control system coupled to a web server. The web server configured in a service oriented architecture and operable to provide a business application by executing a plurality of services on a plurality of computers configured in the distributed computing system. The resource control system is operable to determine a performance parameter of the business application, and provision or un-provision one of the plurality of computers according to the determined performance parameter.

Some embodiments of the disclosure may provide numerous technical advantages. For example, one embodiment of the resource control system may reduce idle time of grid nodes configured in a computing grid. The reduction in idle time may lead to a reduction in computer power consumption and thus cooling requirements. Some embodiments of the resource control system may also enhance reliability of the distributed computing system by reducing the operating time of grid nodes.

Some embodiments may benefit from some, none, or all of these advantages. Other technical advantages may be readily ascertained by one of ordinary skill in the art.

BRIEF DESCRIPTION OF THE DRAWINGS

A more complete understanding of embodiments of the disclosure will be apparent from the detailed description taken in conjunction with the accompanying drawings in which.

DETAILED DESCRIPTION OF EXAMPLE EMBODIMENTS

Executable applications may be provided as multiple modules that are executed simultaneously on distributed computing systems. Distributed computing systems that provide web services may use a service oriented architecture (SOA). A service oriented architecture provides web services by structuring each web service from a number of modules that are called services. These services may be relatively modular for use by various types of web services.

Computing grids that provide web services using a service oriented architecture may provide relatively efficient operation. Distributed computing systems incorporating a service oriented architecture delegate work load across the multiple computers configured in the computing grid. These distributed computing systems, however, may not efficiently handle transient and/or periodic resource demands that may be encountered. A computing grid that provides web services used by a large corporation for example, may encounter a relatively large resource demand during normal working hours and relatively little usage at other hours.

Figure 1:
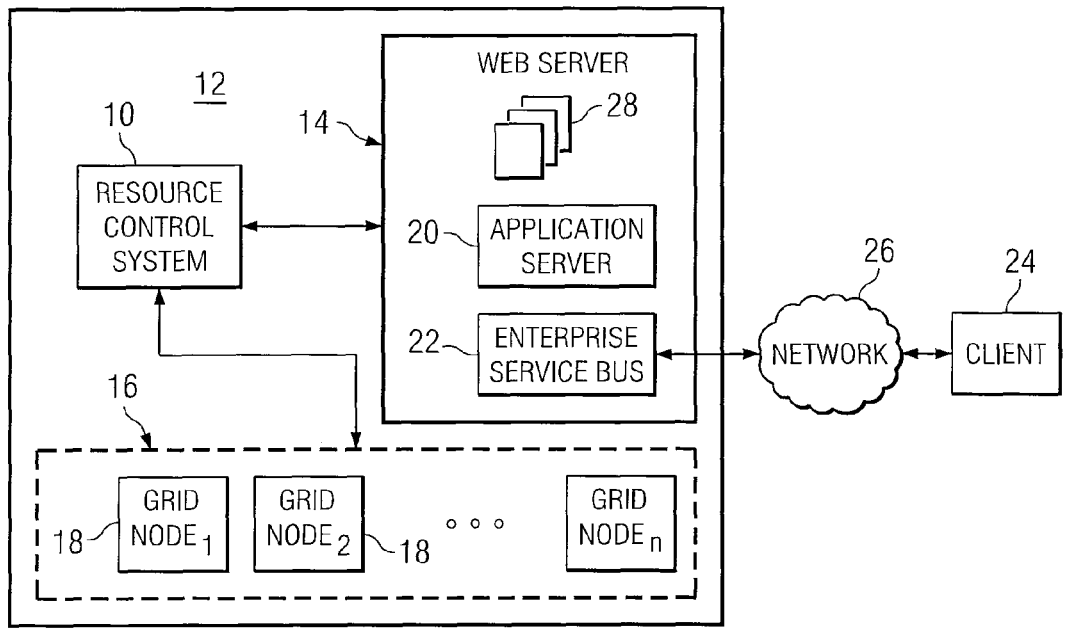
FIG. 1 is a block diagram showing a distributed computing system incorporating one embodiment of a resource control system according to the teachings of the present disclosure.

FIG. 1 shows one embodiment of a resource control system 10 for a distributed computing system 12 that may provide a solution to this problem as well as other problems. Resource control system 10 is coupled to a web server 14. Resource control system 10 and web server 14 are executed on a computing grid 16 having a number of grid nodes 18. Web server 14 includes an application server 20 and a enterprise service bus 22 that provide business applications to a client 24 through a network 26 using one or more services 28. As will be described below, distributed computing system 10 monitors one or more performance parameters of a business application provided by the distributed computing system 10 and provisions and/or un-provisions resources, such as services 28 and grid nodes 18, to maintain the performance parameters at a relatively constant level.

Web server 14 incorporates a service oriented architecture (SOA) using an enterprise service bus 22. Enterprise service bus 22 may orchestrate multiple services 28 together to provide one or more business applications for client 24. Services 28 may be executed on one or more grid nodes 18 configured in computing grid 16. Business applications may be provided to client 24 with an agreed upon level of performance. In some cases, performance parameters of various business applications may be provided under a contractual agreement that may be referred to as a service level agreement (SLA). The service level agreement may include various performance parameters, such as response latency time, average data throughput, minimum data throughput, and the like. Application server 20 provides a common interface to client 24 from which services 28 are executed.

Any suitable type of enterprise service bus 22 may be used. One example of a suitable enterprise service bus 22 is an Aqualogic Service Bus™ available from BEA Systems, located in San Jose, Calif. The Aqualogic Service Bus™ may be configured to monitor various performance parameters of business applications provided to client 24. The Aqualogic Service Bus™ may also be configured to transmit a simple network management protocol (SNMP) trap event if the performance parameter exceeds an upper or a lower threshold value.

According to the teachings of the present disclosure, resource control system 10 dynamically provisions and/or un-provisions grid nodes 18 and services 28 of distributed computing system 12 according to one or more performance parameters of the business application. In one embodiment, the one or more performance parameters are metrics of a service level agreement (SLA).

Resource control system 10 provisions and/or un-provisions grid nodes 18 according to performance parameters of a business application provided by web server 14. In this manner, underutilized resources, such as grid nodes 18 of a computing grid 16 may be turned off to reduce electrical power and/or alleviate cooling requirements for computing grid 16 in some embodiments. Turning off power to an underutilized grid node 18 may also lengthen its operational life in which the overall availability of the computing grid 16 may be enhanced.

In one embodiment, resource control system 10 may provision and/or un-provision services 28 in response to resource demand affecting one or more performance parameters of a service level agreement. For example, a particular business application provides access to data from a remotely coupled database (not specifically shown). To provide the business application, web server 14 may execute a service 28 that operates as a fetch engine to obtain the requested data from the remotely coupled database using appropriate handshaking signals. Resource control system 10 monitors one or more performance parameters of the business application and may provision another instance of the fetch engine service 28 in response to increased resource demand.

Resource control system 10 may provision and/or un-provision grid nodes 18 and/or services 28 in distributed computing system 10 using any suitable scheme. In one embodiment, resource control system 10 provisions or un-provisions grid nodes 18 and/or services 28 instantaneously in response to an increase or decrease, respectively, in resource demand. In another embodiment, grid nodes 18 and/or services 28 are provisioned or un-provisioned based upon a periodic schedule. For example, resource control system 10 may determine that seven grid nodes 18 operating during working hours, and three grid nodes 18 operating after working hours sufficiently maintain business applications provided by web server 14 within performance parameters of a service level agreement. In this example, resource control system 10 may generate this configuration based upon monitored performance parameters over several working days and alternatively provision and un-provision four grid nodes 18 to correspond with the working day.

In another embodiment, resource control system 10 may use a heuristic approach for provisioning and/or un-provisioning grid nodes 18 and/or services 28. That is, resource control system 10 may provision and/or un-provision resources based upon a heuristically assessed resource demand. For example, resource control system 10 may assess that a particular service 28 is to be provisioned based upon a combination of monitored performance parameters and their monitored values relative to one another.

Figure 2:
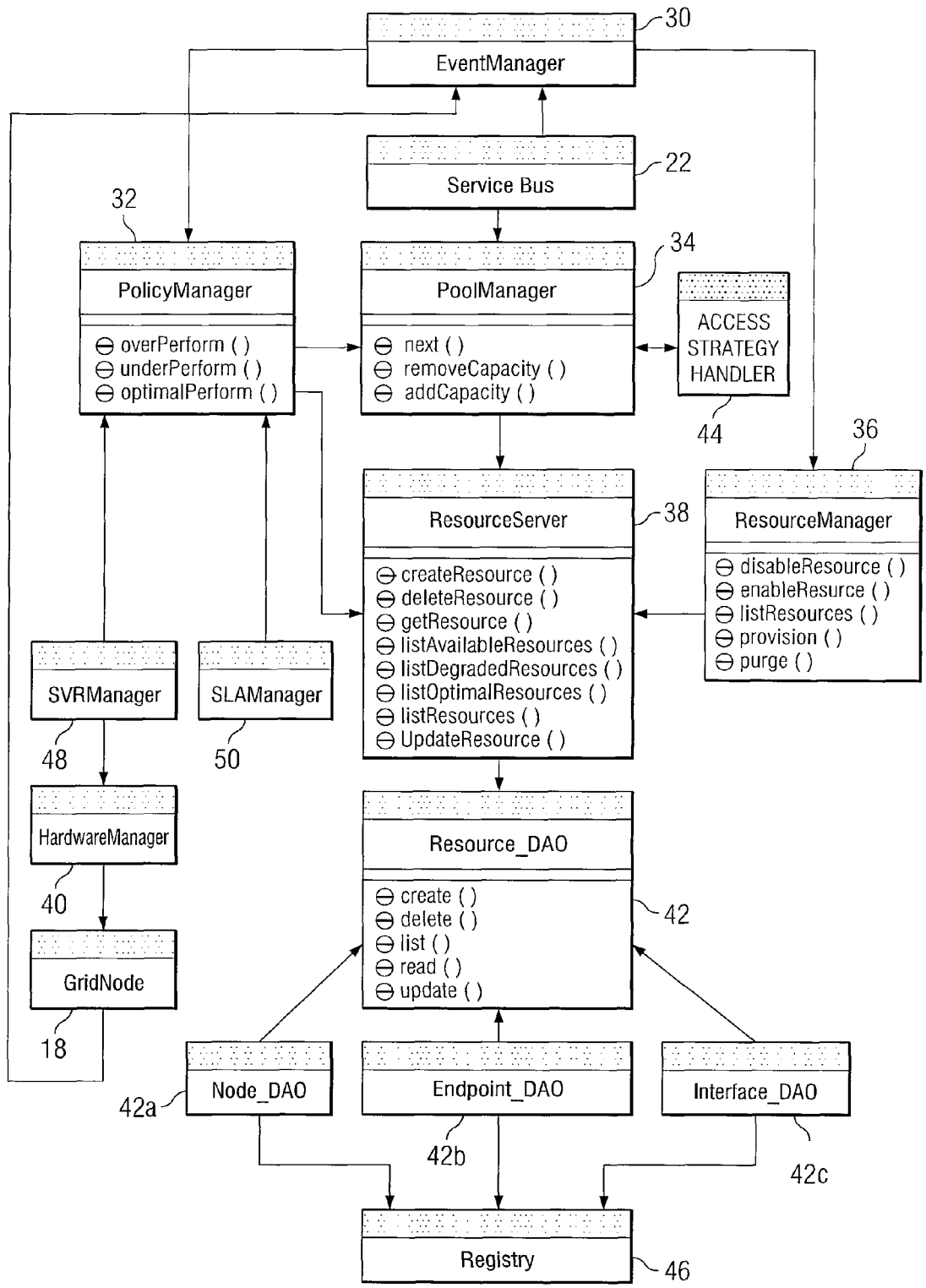
FIG. 2 is a block diagram showing several components of the resource control system of FIG. 1.

FIG. 2 shows several components of resource control system 10. Resource control system 10 includes an event manager 30, a policy manager 32, a pool manager 34, a resource manager 36, a resource server 38, a hardware manager 40, a resource data access object 42, an access strategy handler 44, and a service registry 46 coupled as shown. Policy manager 32 includes a server manager 48 for handling provisioning and un-provisioning of grid nodes 18 and a service level agreement manager 50 for handling provisioning and un-provisioning of services 28. Resource data access object 42 includes a node data access object 42a, an endpoint data access object 42b, and an interface data access object 42c for exposing instances of grid nodes 18, services 28, and clients 24, respectively stored in registry 46. Resource control system 10 may comprise executable instructions stored in a memory and executable on any suitable computing system. In one embodiment, resource control system 10 is executable on one or more grid nodes 18 of computing grid 16.

Event manager 30 receives events generated by enterprise service bus 22 and/or grid nodes 18. In one embodiment, event manager 30 may be configured to respond immediately to events by provisioning or un-provisioning grid nodes 18 or services 28 when the event is received. In another embodiment, event manager 30 may be configured to provision or un-provision grid nodes 18 or services 28 due to a number of received events received over a period of time. For example, a relatively large number of events received during working hours may prompt event manager 30 to schedule an additional grid node 18 to be provisioned during working hours.

Policy manager 32 manages provisioning and un-provisioning of services 28 and grid nodes 18 of computing grid 16. Pool manager 34 manages a pool of existing resources using access strategy handler 44. For example, access strategy handler 44 may incorporate a load balancing algorithm, such as a round-robin or a random access load balancing algorithm. When provisioning or un-provisioning grid nodes 18 and/or services 28, policy manager 32 may request information from access strategy handler 44 to determine what resources are to be provisioned or un-provisioned.

Hardware manager 40 manages provisioning and un-provisioning of grid nodes 18 of computing grid 16. In one embodiment, hardware manager 40 is a virtual machine manager that dynamically provisions or un-provisions one particular grid node 18 while other grid nodes 18 continue operating. One example of a suitable virtual machine manager is a Vmware Server™, available from Vmware, Incorporated, located in Palo Alto, Calif. The Vmware server provide dynamic provisioning of one particular grid node 18 on computing grid 16 while other grid nodes 18 remain operational.

Figure 3:
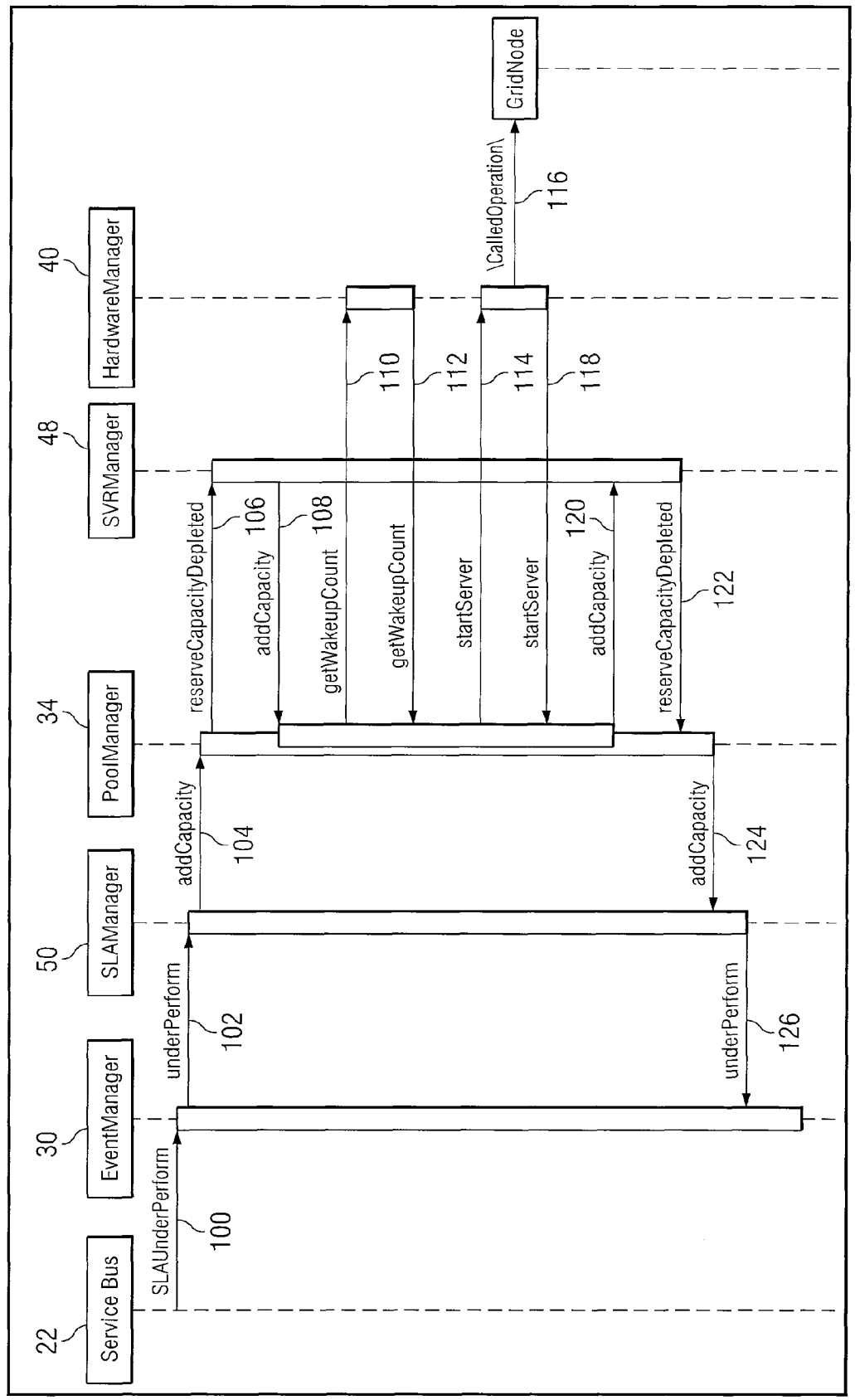
FIG. 3 is a call-flow diagram illustrating one embodiment of a process for provisioning a grid node in response to a determined performance parameter of a service level agreement by the resource control system of FIG. 1.

FIG. 3 is a call-flow diagram illustrating one embodiment of a process for provisioning a grid node 18 in response to a determined performance parameter of a service level agreement. In act 100, enterprise service bus 22 transmits a service level agreement (SLA) underperform message to event manager 30. In one embodiment, enterprise service bus 22 transmits service level agreement underperform message as a simple network message protocol (SNMP) trap message.

Event manager 30 may respond immediately to the service level agreement underperform message or over a period of time in which event manager 30 provisions grid node 18 according to a number of received service level agreement underperform messages using a periodic schedule or according to a heuristically assessing resource demand. In either case, event manager 30 manages provisioning of grid node 18 by transmitting an underperform message to service level agreement manager 50 in act 102.

In act 104, service level agreement manager 50 transmits an add capacity message to pool manager 34. Pool manager 34 maintains the operational status and delegates processing load of active services 28 and grid nodes 18 in computing grid 16. In act 106, pool manager 34 determines a particular grid node 18 to be provisioned by transmitting a reserve capacity depleted message to server manager 48. In act 108, receipt of the reserve capacity depleted message causes server manager 48 to respond with an add capacity message accepting the proposed provisioning of grid node 18.

In act 110, pool manager 34 transmits a get wake up count message to hardware manager 40 to request status and provisioning parameters of the particular grid node 18 to be provisioned. In act 112, hardware manager 40 responds to the get wake up count message by sending a wake up count return message to pool manager 34 including the requested information.

In act 114, pool manager 34 processes the received provisioning parameters and internally maintained status of the proposed grid node 18 to be provisioned and transmits a start server message to hardware manager 40. Receipt of the start server message prompts hardware manager 40 to provision the proposed grid node 18 by sending a called operation message to the grid node 18 in act 116 and transmitting a start server return message to pool manager 34 in act 118.

In act 120, once the response to the start server message is received, pool manager 34 sends a add capacity message to server manager 48 to complete any final provisioning actions by server manager 48. When a reserve capacity completed message is received in act 122, pool manager 34 transmits an add capacity return message to service level agreement manager 50, which is forwarded to event manager 30 as an underperform return message in acts 124 and 126. At this point, provisioning of grid node 18 is complete.

The previously described acts of 100 through 126 describe one embodiment of a process for provisioning a grid node 18 in response to an event transmitted by enterprise service bus 22. In other embodiments, a particular grid node 18 may be un-provisioned in response to an event received from enterprise service bus 22.

Figure 4:
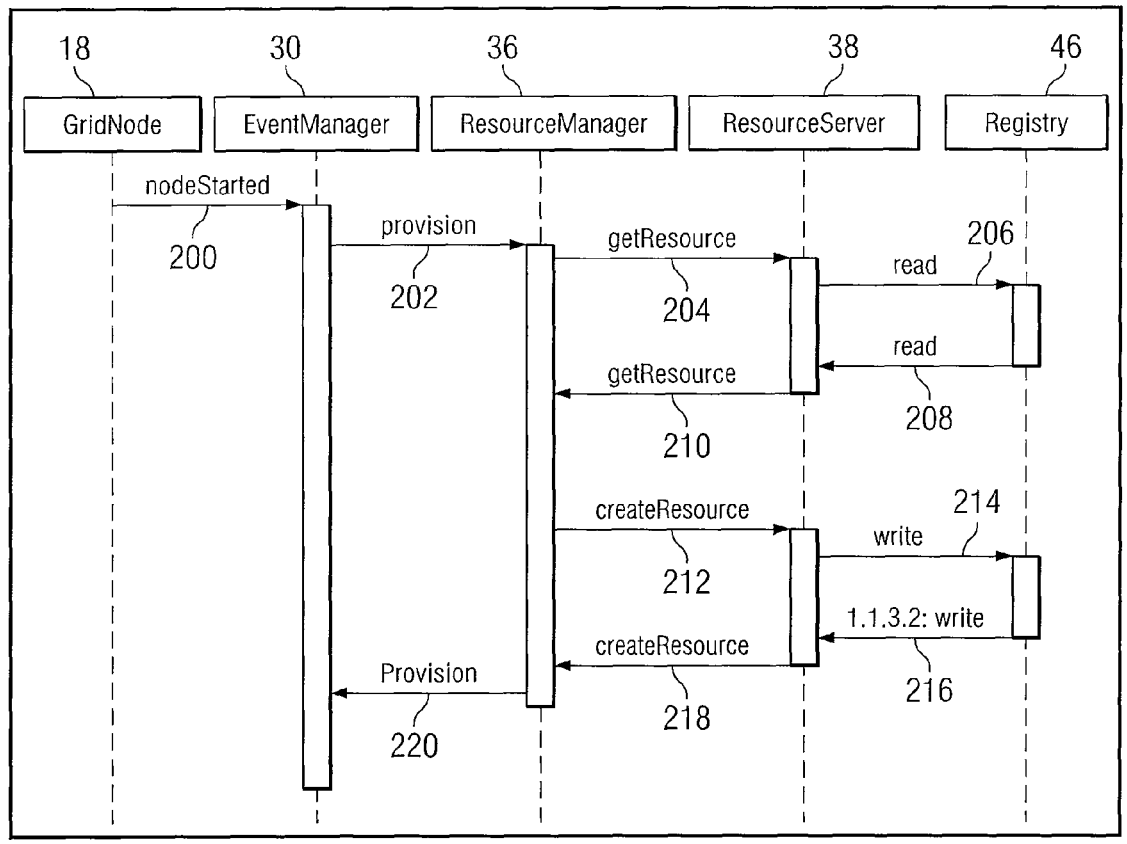
FIG. 4 is a call-flow diagram showing one embodiment of a process for provisioning a service on the newly provisioned grid node.

FIG. 4 is a call-flow diagram showing one embodiment of a process for provisioning a service 28 on the newly provisioned grid node 18. In act 200, grid node 18 transmits a node started message to event manager 30. The node started message may be generated by grid node 18 any time after being provisioned and indicates its availability for processing of services 28. In act 202, event manager 30 forwards a provision message to resource manager 36 in response to receipt of node started message from grid node 18.

Resource manager 36 handles provisioning of services 28 executed on grid nodes 18. To generate services 28 on newly provisioned grid node 18, resource manager 36 accesses resource provisioning information from registry 46 by transmitting a get resource message to resource server 38, which is transmitted to registry 46 as a read message in acts 204 and 206. In response, registry 46 transmits a read return message to resource server 38, which is transmitted to resource manager 36 as a response to the get resource message in acts 208 and 210.

Using provisioning information from registry 46, resource manager 36 updates resource provisioning information in registry 46 by transmitting a create resource message to resource server 38, which is transmitted to registry 46 as a write message in acts 212 and 214. Registry 46 updates its resource provisioning information and responds by transmitting a write return message to resource server 38, which is forwarded to resource manager 36 as a create resource return message in acts 216 and 218. Acts 212 through 218 may be repeatedly performed for provisioning additional services 28 on grid node 18. When the one or more services 28 have been provisioned, resource manager 36 transmits a provision return message back to the event manager 30 in act 220. At this point, provisioning of services 28 on the newly provisioned grid node 18 is complete.

Figure 5:
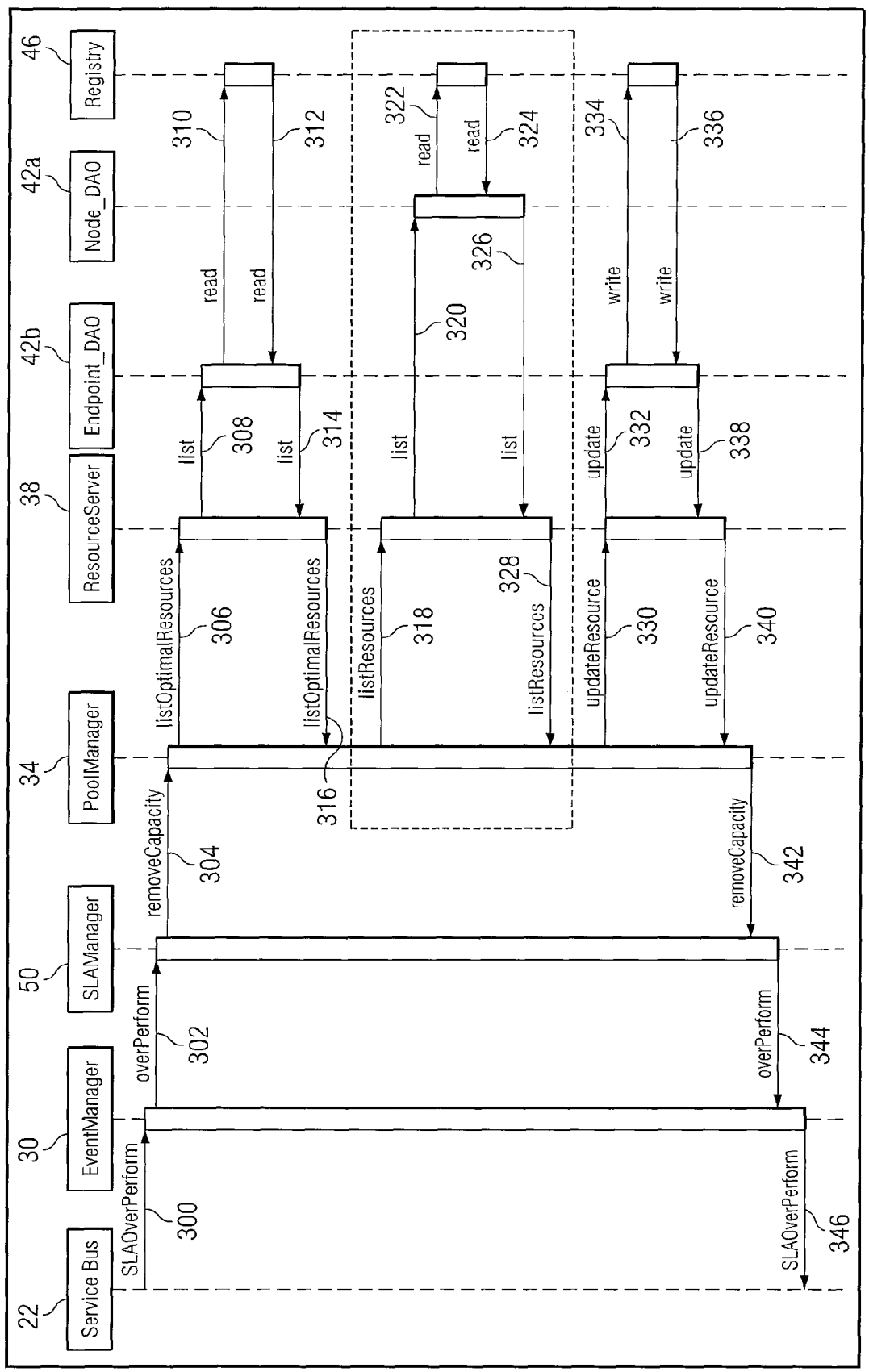
FIG. 5 is a call-flow diagram showing one embodiment of a process for un-provisioning a service in response to a determined performance parameter of a service level agreement by the resource control system of FIG. 1.

FIG. 5 is a call-flow diagram showing one embodiment of a process for un-provisioning a service 28 in response to a determined performance parameter of a service level agreement. In this particular embodiment, enterprise service bus 22 has determined that one or more performance parameters of a service level agreement has exceeded an upper threshold value. In act 300, enterprise service bus 22 transmits a service level agreement overperform message to event manager 30. Event manager 30 may respond to immediately to service level agreement underperform message by un-provisioning a particular service 28, updating a schedule such that the service 28 is provisioned according to the periodic schedule, or heuristically assessing resource demand according to received service level agreement overperform message with other previously received messages. In this particular embodiment, event manager 30 manages un-provisioning of service 28 by transmitting an overperform message to service level agreement manager 50 in act 302.

In act 304, service level agreement manager 50 transmits a remove capacity message to pool manager 34 that handles removal of service 28. To remove service 28, pool manager 34 obtains a list of active services 28 in distributed computing system 12 by transmitting a list optimal resources message to resource server 38. In acts 310, 312, 314, and 316, resource server 38 constructs this list by transmitting a list message to endpoint data access object 42b, which transmits a read message to registry 46 and handling the appropriate response messages from registry 46 and associated endpoint data access object 42b.

Pool manager 34 then determines the status of services 28 that were obtained in acts 306 through 316. In one embodiment, the status of services 28 may be determined by determining the loading and other performance factors of particular grid nodes 18 that execute these services 28. In the particular embodiment, pool manager 34 obtains information for each service 28 by transmitting a list resource message to resource server 38 in act 318. In act 320, resource server 38 transmits a list message to node data access object 42a, which transmits a read message to registry 46 in acts 320 and 322. In acts 324, 326, and 328, registry 46 responds by transmitting grid node information back to pool manager 34 using read return message, list return message, and list resources return message, respectively. Acts 318 through 328 are repeatedly performed for each service 28 obtained in acts 306 through 316 to determine the status of grid nodes 18 on which these services 28 are executed. Given this information, pool manager 34 determines a particular service 28 that may be removed. In one embodiment, services 28 may be selected for removal based upon loading. That is, services 28 that are overloaded may be selected for removal from distributed computing system 12.

In act 330, pool manager 34 transmits an update resource message to resource manager 36 to remove service 28. In acts 332 and 334, resource manager 36 removes service 28 and updates registry 46 by transmitting an update message to endpoint data access object 42b, which transmits a write message to registry 46. In acts 336 and 338, registry 46 responds by transmitting a read return message to node data access object 42a, which transmits a list return message to resource manager 36. Once the service 28 has been removed and registry 46 updated, a update resource response message is transmitted to pool manager 34 in act 340.

In act 342, pool manager 34 transmits a remove capacity return message to service level agreement manager 50 in response to the remove capacity message transmitted in act 304. In act 344, service level agreement manager 50 transmits an overperform return message to event manager 30 in response to the overperform message transmitted in act 302. In act 346, event manager 30 transmits a service level agreement overperform return message in response to the service level agreement overperform message of act 300. At this point, removal of a particular service 28 according to a performance parameter of a service level agreement is complete.

The previously described acts of 300 through 346 describe one embodiment of a process for un-provisioning a service 28 in response to a performance parameter that exceeds an upper threshold value of performance. In other embodiments, a service 28 may be added in response to a performance parameter that goes below a lower threshold value of performance. To add a service 28, pool manager 34 may obtain a list of available services 28 and grid nodes 18 from registry 46. From this list, pool manager 34 may then determine a particular grid node 18 to execute the desired service 28, and launch the service 28 using resource server 38.

A resource control system 10 has been described in which services 28 and/or grid nodes 18 of a computing grid 16 may be provisioned or un-provisioned according to monitored performance parameters of a service level agreement. In the embodiment described above, provisioning and un-provisioning of services 28 and/or grid nodes 18 may be handled by an event manager 30. The event manager 30 provisions and un-provisions services 28 and/or grid nodes 18 immediately in response to an generated performance parameter triggered event, to a periodic schedule, or to a heuristically determined assessed resource demand.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A distributed computing system comprising:
a computer-implemented resource control system communicatively coupled to a web server, the web server configured in a service oriented architecture and operable to provide a business application by executing a plurality of services on a plurality of grid nodes configured in a computing grid, the resource control system operable to:
receive a performance parameter of the business application;
dynamically provision or un-provision one of the plurality of grid nodes according to the received performance parameter while the other grid nodes in the plurality of grid nodes remain operational; and
provision or un-provision one of the plurality of services according to the received performance parameter independent of dynamically provisioning or un-provisioning any of the plurality of grid nodes according to the received performance parameter.

2. The distributed computing system of claim 1, wherein the resource control system is operable to provision or un-provision one of the plurality of computers instantaneously in response to the received performance parameter exceeding a threshold value.

3. The distributed computing system of claim 1, wherein the resource control system is operable to provision or un-provision one of the plurality of computers according to a periodic schedule.

4. The distributed computing system of claim 1, wherein the resource control system is operable to provision or un-provision one of the plurality of computers according an heuristically assessed resource demand.

5. A distributed computing system comprising:
a resource control system communicatively coupled to a web server, the web server configured in a service oriented architecture and operable to provide a business application by executing a plurality of services on a plurality of computers configured in the distributed computing system, the resource control system operable to:
determine a performance parameter of the business application, the determined performance parameter indicating a level of performance at which the business application is operating;
provision or un-provision one of the plurality of computers according to the determined performance parameter; and
provision or un-provision one of the plurality of services according to the determined performance parameter independent of provisioning or un-provisioning any of the plurality of computers according to the determined performance parameter.

6. The distributed computing system of claim 5, wherein the resource control system is operable to provision or un-provision one of the plurality of services according to the determined performance parameter.

7. The distributed computing system of claim 5, wherein the resource control system comprises a virtualization engine, the virtualization engine operable to dynamically provision or un-provision one of the plurality of computers while the other plurality of computers are operating.

8. The distributed computing system of claim 5, wherein the plurality of computers comprise a plurality of grid nodes, the resource control system operable to provision or un-provision one of the plurality of grid nodes according to the determined performance parameter.

9. The distributed computing system of claim 5, wherein the resource control system is operable to provision or un-provision one of the plurality of computers instantaneously in response to the determined performance parameter exceeding a threshold value.

10. The distributed computing system of claim 5, wherein the resource control system is operable to provision or un-provision one of the plurality of computers according to a periodic schedule.

11. The distributed computing system of claim 5, wherein the resource control system is operable to provision or un-provision one of the plurality of computers according an heuristically assessed resource demand.

12. The distributed computing system of claim 5, wherein the resource control system comprises a service registry for storage of configuration information of the plurality of computers and the plurality of component services, the service registry comprising a universal description and discovery identification (UDDI) protocol.

13. A method comprising:
determining a performance parameter of a business application provided by a plurality of services, the plurality of services operable to be executed on a plurality of computers configured in the distributed computing system, the determined performance parameter indicating a level of performance at which the business application is operating;
provisioning or un-provisioning one of the plurality of computers according to the determined performance parameter; and
provisioning or un-provisioning one of the plurality of services according to the determined performance parameter independent of provisioning or un-provisioning any of the plurality of computers according to the determined performance parameter.

14. The method of claim 13, further comprising provisioning or un-provisioning one of the plurality of services according to the determined performance parameter.

15. The method of claim 13, further comprising dynamically provisioning or un-provisioning one of the plurality of computers while the other plurality of computers are operating.

16. The method of claim 13, wherein provisioning or un-provisioning one of the plurality of computers according to the determined performance parameter further comprises provisioning or un-provisioning one of the plurality of computers instantaneously in response to the determined performance parameter exceeding a threshold value.

17. The method of claim 13, wherein provisioning or un-provisioning one of the plurality of computers according to the determined performance parameter further comprises provisioning or un-provisioning one of the plurality of computers according to a periodic schedule.

18. The method of claim 13, wherein provisioning or un-provisioning one of the plurality of computers according to the determined performance parameter further comprises provisioning or un-provisioning one of the plurality of computers according an heuristically assessed resource demand.

19. The method of claim 13, further comprising provisioning or un-provisioning one of a plurality of grid nodes according to the determined performance parameter, the plurality of the plurality of computers comprising the plurality of grid nodes.

20. The method of claim 13, further comprising storing references to the plurality of computers and the plurality of services in a registry using a universal description and discovery identification (UDDI) protocol.

21. A distributed computing system comprising:
a computer-implemented resource control system for managing resources of a business application, the business application provided by executing a plurality of services on a plurality of grid nodes, the resource control system operable to:

receive a performance parameter of the business application;

determine whether to dynamically provision or un-provision one of the plurality of grid nodes based on the performance parameter while the remaining grid nodes in the plurality of grid nodes remain operational for executing the plurality of services that provide the business application;

dynamically provision or un-provision one of the plurality of grid nodes based on the determination to dynamically provision or un-provision one of the plurality of grid nodes;

determine whether to provision or un-provision one of the plurality of services based on the performance parameter independent of the determination to dynamically provision or un-provision any of the plurality of grid nodes based on the performance parameter; and provision or un-provision one of the plurality of services based on the determination to provision or un-provision one of the plurality of services.

22. The distributed computing system of claim 21, wherein the resource control system operable to determine whether to dynamically provision or un-provision one of the plurality of grid nodes based on the performance parameter is operable to determine whether to provision or un-provision one of the plurality of grid nodes instantaneously in response to the performance parameter exceeding a threshold value.

23. The distributed computing system of claim 21, wherein the resource control system is operable to dynamically provision or un-provision one of the plurality of grid nodes according to a periodic schedule.

24. The distributed computing system of claim 21, wherein the resource control system is operable to dynamically provision or un-provision one of the plurality of grid nodes according an heuristically assessed resource demand.

* * * * *